United States Patent [19]

Klingel

[11] Patent Number: 4,869,141
[45] Date of Patent: Sep. 26, 1989

[54] PUNCH PRESS WITH ROTARY RAM AND METHOD OF OPERATING SAME

[75] Inventor: Hans Klingel, Moeglingen, Fed. Rep. of Germany

[73] Assignee: Trumpf GmbH & Co., Ditzingen, Fed. Rep. of Germany

[21] Appl. No.: 661,399

[22] Filed: Oct. 16, 1984

[51] Int. Cl.$^4$ .............................................. B26D 5/26
[52] U.S. Cl. ........................................ 83/49; 83/76.1;
 83/414; 83/559; 83/698; 83/916
[58] Field of Search ................. 83/34, 35, 49, 552,
 83/559, 414, 698; 29/568

[56] References Cited

U.S. PATENT DOCUMENTS

| | | | |
|---|---|---|---|
| 751,723 | 2/1904 | Doolittle | 83/559 |
| 1,155,479 | 10/1915 | Gray | 83/559 X |
| 2,088,202 | 7/1937 | Gray | 83/559 X |
| 3,241,755 | 3/1966 | Goodman | 83/559 X |
| 3,816,904 | 6/1974 | Herb | 72/446 X |
| 4,160,372 | 7/1979 | Bergman et al. | 83/698 X |
| 4,184,358 | 1/1980 | Gorlitsin et al. | 83/698 X |
| 4,274,801 | 6/1981 | Herb et al. | 269/73 X |
| 4,285,259 | 8/1981 | Jelinek et al. | 83/552 |
| 4,412,469 | 11/1983 | Hirata et al. | 83/552 |

Primary Examiner—Donald R. Schran
Assistant Examiner—Rinaldi Rada

[57] ABSTRACT

A punch press has a ram assembly with a lower portion which is rotatable and reciprocatable about a vertical axis and, a die holder which is rotatable about the same axis. A gear mechanism is coupled between a drive motor and the lower portion of the ram assembly and the die holder to effect simultaneous rotation thereof, which effects reorientation of the tooling relative to the X and Y axes of the punch press. In this fashion, rotation of the tooling will enable a single set of tooling to effect cutouts of different orientation in a workpiece relative to the X and Y axes, and movement of the sheet material along the X and Y axes together with such rotation of the tooling enables complex configurations to be nibbled or cutout with a limited number of sets of tools.

1 Claim, 5 Drawing Sheets

PUNCH PRESS WITH ROTARY RAM AND METHOD OF OPERATING SAME

BACKGROUND OF THE INVENTION

As is well known, punch presses are highly useful for producing various types of cutouts in sheet-like workpieces of metal, plastic, composite materials, and the like. In recent years, numerically controlled punch presses have enabled the production of relatively complex cutouts by repetitive punch strokes in nibbling operations, because movement of a workpiece clamping mechanism may be controlled by an X-Y coordinate guidance system.

Moreover, with the advent of large turret assemblies in turret-type punch presses and with the later advent of automatic tool changer type punch presses, a fairly large amount of tooling will be provided within the press so that the operative punch and die may be readily changed. Thus, even complex configurations have been made possible through the optimization of computer numerically controlled systems in presses providing a multiplicity of interchangeable tools.

However, the configuration of cutouts that could be obtained by a punch press still has been dictated by the specific tooling available for operation without changing the tools in the turrets or in the tool changer carriers, and it has generally been necessary to change the tooling in the operative ram position in order to effect any modification in the cutout being produced. More recently in Hirata at al, U.S. Pat. No. 4,412,469 granted Nov. 1, 1983, it has been proposed to provide additional variation in the nature of the punching operation by a rotatable set of tooling in a turret-type punch press. More particularly, at the two diametrically spaced positions in the turrets, there has been provided tooling which can be rotated by a pair of servomotors. As a result, rotation of the tooling may be coupled with the indexing of the workpiece to produce cutouts at different angular relationships.

Although this turret-type apparatus does afford the opportunity for changing the angular position of the tooling in the operative location below the ram, it is subject to the requirement that the tooling be changed in the turrets in those positions which have the drive mechanism for rotating the tooling. Moreover, the provision of drive mechanisms for each of the turrets significantly reduces the amount of tooling that is stored therein. Additionally, turret-type punch presses inherently afford less control over the movement of the punch so that increased wear may be expected, which may be compounded by the requirements for the rotational coupling to effect the desired rotational movement.

It is an object of the present invention to provide a novel and rugged punch press wherein the punch tooling is rigidly coupled to the lower portion of the ram assembly so as to move integrally therewith and to provide a mechanism which effects rotation of the lower portion of the ram and thereby be the punching.

It is also an object to provide such a press in which the die holder assembly securely receives the die in alignment with the cooperating punch and in which the die holder assembly is rotated to effect the rotation of the die simultaneously with the rotation of the punch.

Another object is to provide such a punch press which ensures precise rotation of the punch and die n unison to avoid misalignment.

A further object is to provide a novel method of punching sheet-like workpieces so as to form relatively complex and large cutouts in the sheet-like workpiece at a rapid rate with limited sets of tooling.

SUMMARY OF THE INVENTION

It has now been found that the foregoing and related objects may be readily attained in a punch press which includes a frame providing a base and a head spaced thereabove, and a ram assembly mounted on the head of the frame and including an upper portion and a lower portion reciprocatable in the head for movement along a vertical axis towards and away from the base. The lower portion of the ram assembly is rotatable about this vertical axis relative to its upper portion, and first drive means is mounted on the head for reciprocating the lower portion of the ram assembly.

On the lower portion of the ram assembly is provided coupling means for engaging a punch to mount it securely thereon. A die holder is rotatably supported on the base for rotation about an axis coaxial with that of the ram lower portion, and it is adapted to engage securely a die cooperating with the associated punch on the ram lower portion.

Second drive means is mounted on the frame at a location spaced from the ram assembly and die holder for effecting simultaneous and equivalent rotation of the ram lower portion and die holder, and rotational means is coupled therebetween. It includes a first member driven by the second drive means, and a pair of vertically spaced, generally horizontally extending members movably supported on the frame. These horizontal members have first end portions drivingly engaged with the first member and opposite end portions drivingly engaged with the ram lower portion and die holder to effect simultaneous rotation thereof about the vertical axis. Control means is provided to control the operation of the first and second drive means to effect reciprocation and rotation of the ram lower portion and rotation of the die holder when the ram lower portion is spaced above the base.

In the preferred embodiments, the rotational means comprises intermeshing gear surfaces on the first and horizontally extending members and on the die holder and ram lower portion. Desirably, this rotational means will include pinion gears on the first member and rack sections at the ends of horizontally extending members. The die holder and lower ram portion will have pinion gear teeth thereon engaged with the rack sections, whereby rotation of the pinion gears of the first member of the rotational means will produce longitudinal movement of the horizontally extending members to effect rotation of the die holder and ram lower portion. The first member of the rotational means will preferably be a vertically disposed shaft rotatably supported on the frame with the pinion gears adjacent its upper and lower ends. This vertical shaft will include an intermediate gear means thereon drivingly engaged with the second drive means to effect rotation of the vertical shaft. The rotational means is actuatable by the second drive means in both directions of rotation to effect rotation of the ram lower portion and die holder in either direction of rotation.

Usually, the press will include a work support table supported on the frame and extending about the die holder for supporting an associated workpiece thereon, and workpiece clamping means supported on the frame for movement along X and Y axes relative to the vertical axis defined by the axis of rotation of the ram lower portion and die holder. The control means operates drive means for the clamping means to affect relative movement thereof along the X and Y axes.

Desirably, the punch press includes hydraulically actuatable means on the ram lower portion and on the die holder for firmly securing the associated punch and die. The frame is of generally C-shaped configuration to provide base and head and a vertically extending portion therebetween spaced from the ram assembly and die holder.

The preferred presses will include an automatic tool changer assembly supported on the frame adjacent the ram assembly and die holder and including (i) a pair of vertically spaced carriers supported for rotation about a vertical axis spaced from and parallel to the axis of rotation of the ram lower portion and die holder. The carriers each have a multiplicity of recesses spaced circumferentially thereabout for receiving punches and dies respectively, (ii) moving means for moving an associated punch and die located in the recesses at the circumferential position aligned with the ram lower portion punch and die holder, and for removing and moving an associated punch and die from the ram lower portion and die holder and into storage recesses in the carriers, (iii) means for rotating the carriers, and (iv) means for operating the moving means. The control means also controls the operation of the tool changer assembly to exchange punches and dies.

In the method of the present invention, cutouts are produced from a sheet-like workpiece by a series of steps including providing a punch press having a frame with a base and head spaced thereabove, a ram assembly in the head including an upper portion and a lower portion reciprocatable along a vertical axis relative to the base of the punch press frame and rotatable relative to the upper portion about that axis, and a die holder mounted on the base of the frame for rotation about an axis coaxial with the axis of rotation of the ram lower portion. A punch is mounted on the lower end of the ram lower portion, and a die cooperating with the punch is mounted in the die holder. A sheet-like workpiece is supported between the die and punch, and the ram lower portion is reciprocated to drive the punch through the workpiece to produce a cutout.

The workpiece is then indexed in a horizontal plane a predetermined distance relative to the vertical axis of rotation of the die and ram lower portion, and the ram lower portion and die holder are simultaneously rotated. The ram lower portion is then reciprocated to drive the punch through the workpiece to produce a cutout, and the indexing, rotating and reciprocating steps are repeated.

In accordance with one embodiment of the method, the indexing step advances the workpiece a distance not greater than the cross section of the punch, and the second step of reciprocation of the ram lower portion produces a cutout contiguous to that produced in the preceding step of reciprocation. Thus, repetition of the indexing, rotating and reciprocating steps provides a series of contiguous cutouts which produce a relatively large contoured cutout. The configuration of the relatively large contoured cutout may, and usually will, be distinct from that of the punch.

In another embodiment of the method, after some number of punch strokes, there are substituted a second punch and second die of a configuration distinct from those of the first punch an die. Further punching, indexing and rotating steps are then conducted. As a result, there is provided a cutout of a cross section different from that produced by the first punch and die. The indexing steps advance the workpiece a distance not greater than the cross section of the punches. This use of punches and dies of 2 or more cross sectional configurations or dimension produces an enlarged contoured cutout having a configuration distinct from those of the several sets of punches and dies.

DETAILED DESCRIPTION OF THE ILLUSTRATED EMBODIMENTS

Figure 1:
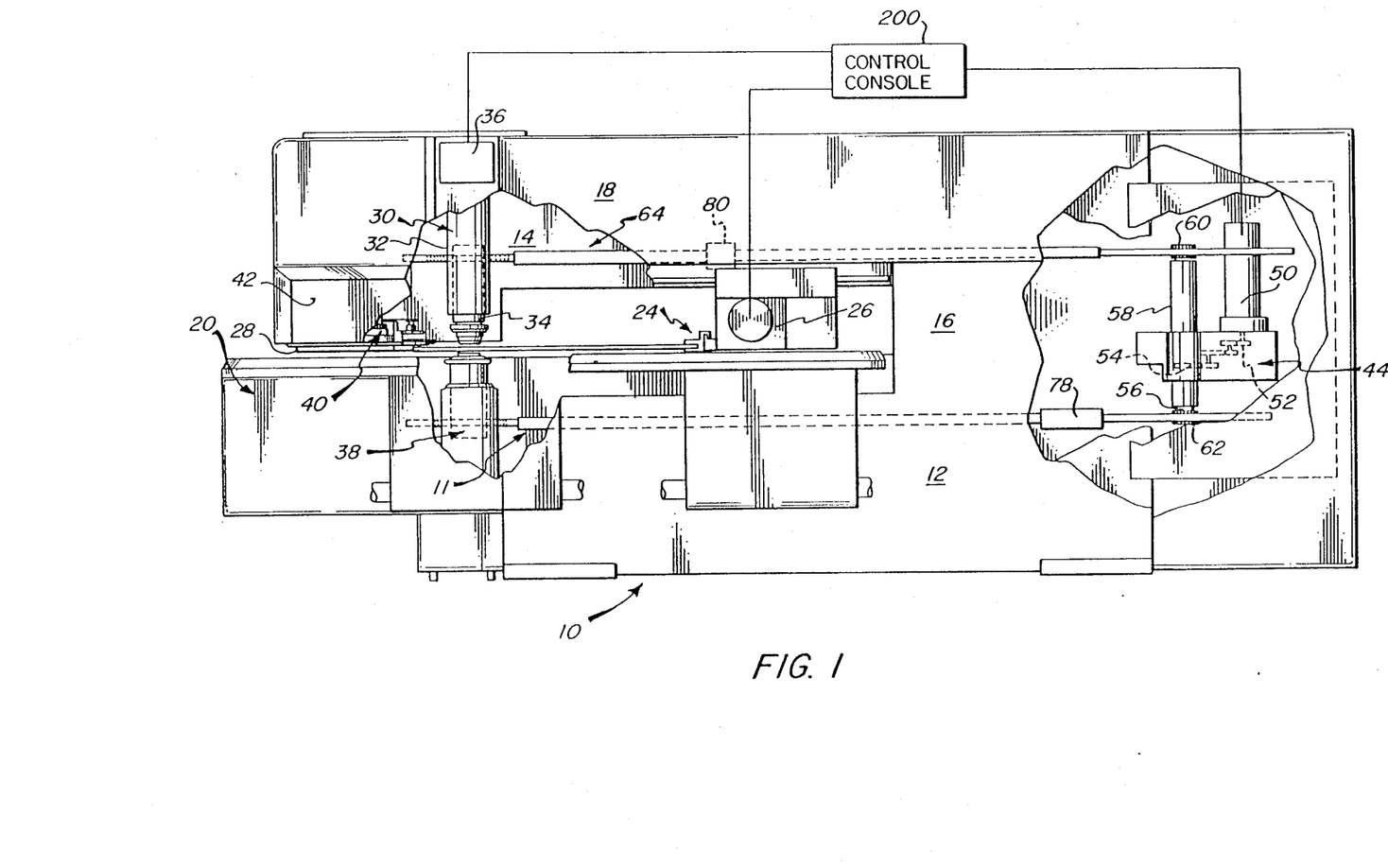
FIG. 1 is a partially diagrammatical side elevational view of an automatic tool changer type punch press embodying the present invention with portions broken away to reveal internal construction.

Turning in detail first to FIG. 1 of the attached drawings, therein illustrated is an automatic tool changer punch press embodying the present invention which has a C-shaped frame generally designated by the numeral 10 providing a base 12, a head 14 extending in spaced relationship thereabove, and a vertically extending web or center section 16 at the rear thereof. Sheet metal covers 18 are mounted along the sides and front and rear thereof to enclose various elements of the structure and mechanical, electrical and hydraulic components for safety and aesthetic considerations.

A worktable generally designated by the numeral 20 is supported on the base 12. A workpiece clamping and indexing assembly generally designated by the numeral 24 is supported on the base 12 of the frame 10 adjacent the center section 16, and is movable along X and Y axes relative to the table 20 by drive mechanisms including that in the drive housing 26. In this fashion, the workpiece 28 may be moved in X and Y directions on the table 20 under the head 14.

Mounted on the forward end of the head 14 of the frame 10 is a ram assembly generally designated by the numeral 30 and including an upper portion 32 and a lower portion 34, both to be described more fully hereinafter. The drive mechanism for reciprocating the lower portion 34 of the ram assembly 30 is located in the upper portion of the ram assembly 30 and is diagrammatically illustrated by the numeral 36. Mounted on the base 12 of the frame 10 is a die holder assembly generally designated by the numeral 38. An automatic tool changer mechanism generally designated by the numeral 40 is disposed within the tool changer housing 42 at the front of the press.

In accordance with the present invention, the press includes a rotational assembly, generally designated by the numeral 44, for rotating the lower portion 34 of the ram assembly 30 and the die holder assembly 38. This includes a bi-directional motor 50 having a shaft on which is mounted the first of a series of gears in the gear train 52, which transmits the rotational output of the motor 50 to a pinion gear 54 mounted on the vertical shaft 56 intermediate its length. The shaft 56 is rotatably supported in the support member 58 and has pinion gears 60, 62 at its upper and lower ends.

Figures 4, 5:
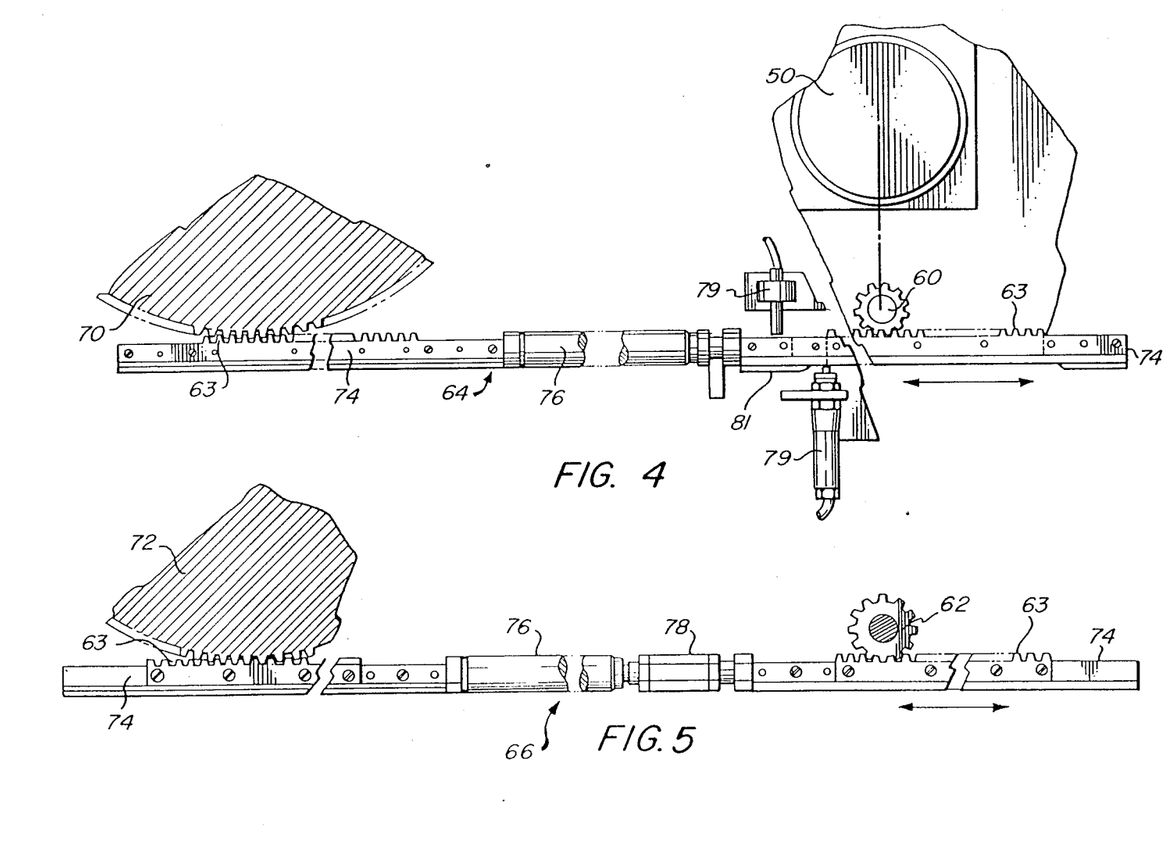
FIG. 4 is a fragmentary plan view of the drive assembly on one side of the punch press head to effect rotation of the ram which is fragmentarily illustrated.
FIG. 5 is a fragmentary plan view of the drive assembly on one side of the punch press base to effect rotation of the die holder which is fragmentarily illustrated.

As seen in greater detail in FIGS. 4 and 5, the pinion gears 60, 62 in turn mesh with rack gears 63 on the elongated horizontal members generally designated by the numerals 64, 66 which are slidably supported on guides 80 at spaced points along the length of the frame 10 for horizontal movement in either direction. At their opposite ends, the horizontal members 64, 66 have rack gears 63 which mesh with pinion gears 70, 72 on the periphery of the ram lower portion 34 die holder assembly 38.

The end portions of the horizontal members 64, 66 comprise L-shaped bar sections 74 which have the rack gears 63 bolted thereto. At their inner ends, the bar sections 74 are joined to tubular sections 76. The lower horizontal member 66 includes a threadably adjustable coupling 78 to permit adjustment of the overall length thereof. As seen in FIG. 4, proximity switches 79 are mounted on the frame 10 and are actuated by limit cams 81 (only one shown) on the upper horizontal member 64. These terminate operation of the motor 50 and thus the forward and rearward movement of the horizontal members 64, 66 and the corresponding rotation of the lower portion 34 of the ram assembly 30 and the die holder assembly 38.

Figure 2:
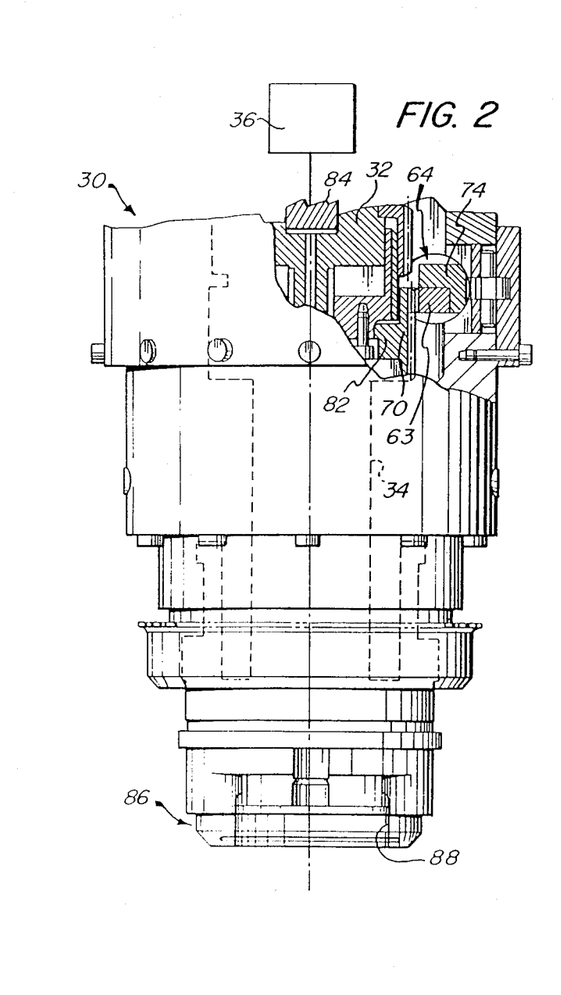
FIG. 2 is a fragmentary front elevational view to an enlarged scale of the lower portion of ram assembly with portions broken away to reveal internal construction.

Turning now to FIG. 2, the intermeshing of the rack gear 63 with the pinion gear 70 on the ram assembly 30 may be seen in detail. The rack gear 63 is secured to the underside of the inverted L-shaped bar section 74 and has its teeth interengaged with the teeth of the pinion gear 70, which is in the form of a collar 82 supported on the upper end of the lower portion 34 of the ram assembly 30. In this view, the ram assembly is shown in a work engaging position, i.e., a lowered position of the lower portion 34. Because the lower portion 34 is rotatable about the upper portion 32, longitudinal movement of the rack gear 63 rotates the pinion gear 70 and thereby the lower portion 34. Depending upon the direction of longitudinal movement of the horizontal member 64, the lower ram portion 34 will be rotated clockwise or counterclockwise.

In this view can be seen the plunger 84 on the crankshaft extending into a recess in the upper end of the upper portion 32 because the illustrated embodiment utilizes a crankshaft or eccentric drive mechanism as the drive mechanism 36. The downstroke of the plunger 84 has caused the upper portion 32, and thereby the lower portion 34, to move downwardly in the housing of the ram assembly 30.

Also seen in this FIG. is the stripper holder assembly generally designated by the numeral 86 which has a relatively wide recess 88 at its lower end in the front portion of its periphery for introduction of the punch and stripper tooling (not shown).

Figure 3:
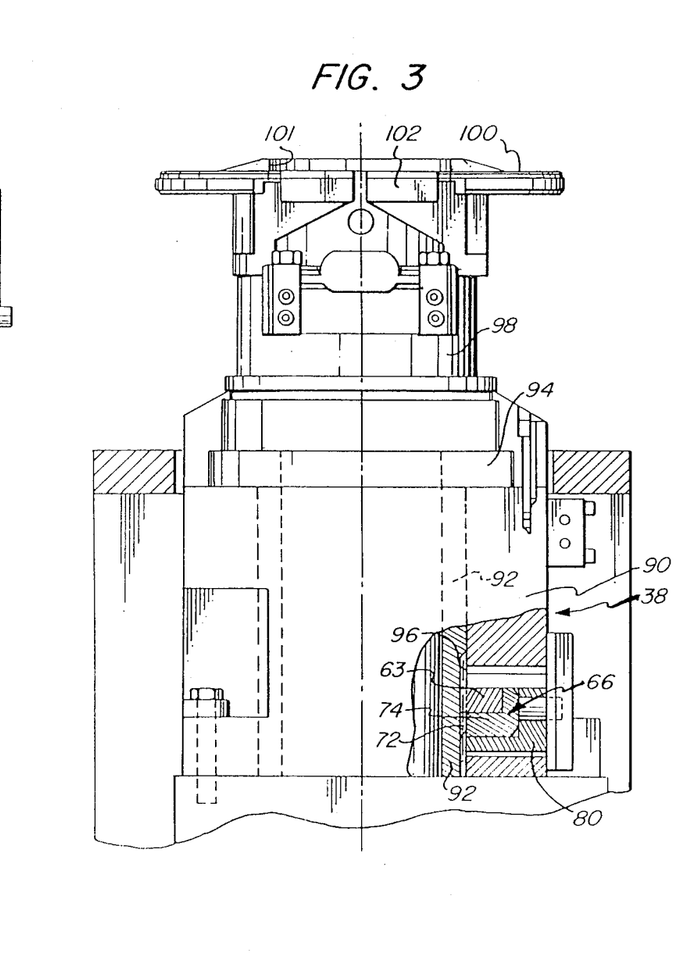
FIG. 3 is a fragmentary front elevational view to an enlarged scale of the die assembly console with portions broken away to reveal internal construction.

Turning now to FIG. 3, the die holder assembly 38 includes a support 90 and a generally tubular sleeve 92 with a collar 94 seated on the support 90. Adjacent its lower end, the periphery of the sleeve 92 is provided with axially extending gear teeth 96 and this member provides the pinion gear 72. The rack gear 63 is secured to the bar section 74 of the longitudinal member 66 and meshes with the teeth 96. It is slidable on the guide 80, and its longitudinal movement effects rotation of the die holder assembly 38. The die holder block 98 has a collar 100 extending about its upper periphery and a relatively large aperture 101 in its front portion to permit insertion of the die. The hydraulically actuated cam elements 102 will clamp the die when it is inserted into the block 98. Since the block 98 is clamped to the sleeve 92, it will rotate therewith.

Figure 6:
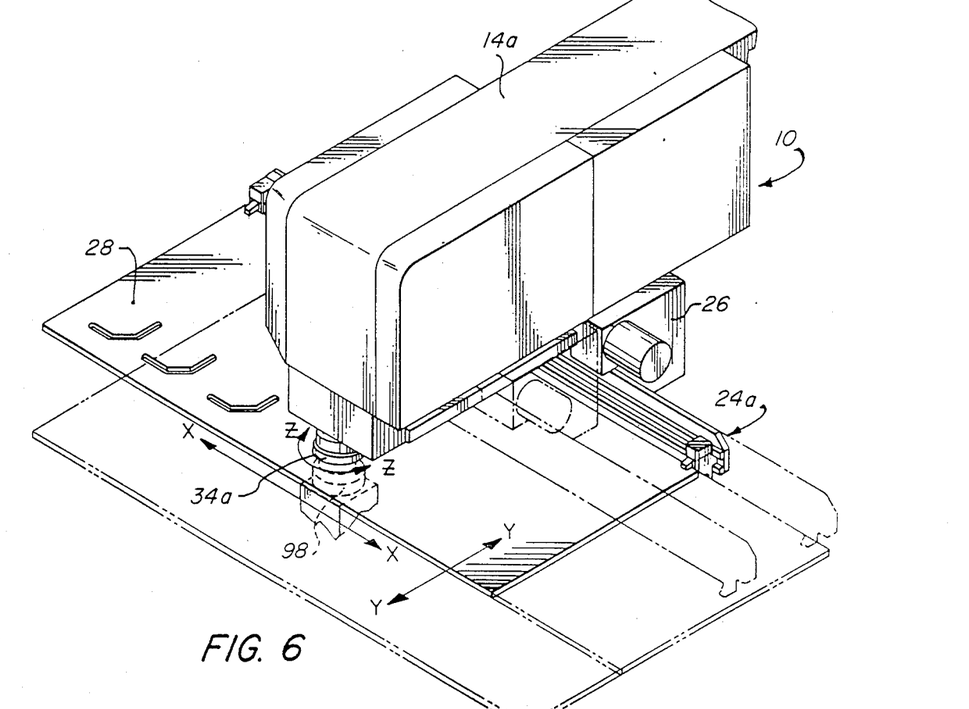
FIG. 6 is a partially diagrammatic and fragmentary perspective view of a manual tool changer type punch press with a workpiece on the table showing cutouts therein produced by rotating the punch and die mounted on the ram and in the die holder and moving the workpiece along X and Y axes.

In FIG. 6, there is fragmentarily illustrated a semi-automatic tool changer type punch press showing the head 14a of the frame 10 and the workpiece clamping mechanism 24a and one of its drive housings 26. Between the lower portion 34a of the ram assembly and the die holder block 98 of the die holder assembly, is disposed a sheet-like workpiece 28 shown in phantom and solid line in several indexed positions resulting from movement of the clamping mechanism 24a into several indexed positions thereof also shown in phantom line and in solid line. The bidirectional rotation of the lower portion 34a of the ram assembly is indicated by the bidirectional arrow. In this type of press, the tooling is quickly changed in the ram assembly and in the die holder by the manually operable tool cartridge shown in FIG. 7 and generally designated by the numeral 104.

Figure 7:
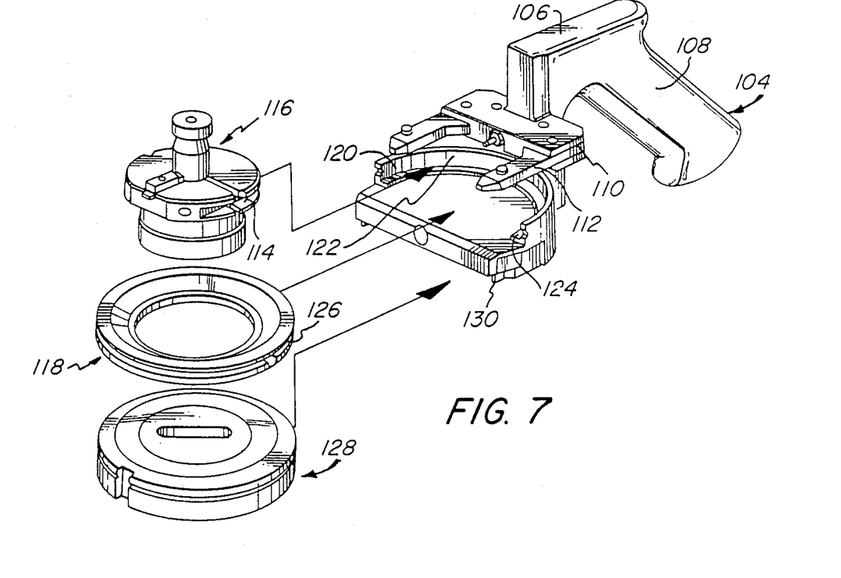
FIG. 7 is a perspective view of a manual tool changer cartridge assembly for use in the punch press of FIG. 6 with the punch, die and stripper exploded outwardly therefrom.

As seen, the holder or cartridge 104 includes a body member 106 with a handle 108 and a punch carrier 110 with spring-loaded pivotable arms 112 to seat in the channels 114 on the periphery of the punch generally designated by the numeral 116 and grip the walls at the base thereof. The stripper generally designated by the numeral 118 slidably seats on the seat 120 provided by the arcuate collar 122 with the horizontal flange 124 slidably extending into the groove 126 on the sidewall thereof, and is firmly held by springs (not shown) bearing thereon. The die generally designated by the numeral 128 seats between a pair of spring-like arms 130. When the tool cartridge 104 is moved into alignment with the recesses in the stripper holder assembly 86 and die holder block 98 (both seen in other figures), a switch (not shown) is triggered which actuates hydraulic clamping mechanisms to firmly grip the die 128, stripper 118 and punch 116. The holder 104 may then be withdrawn from the tooling since the clamping pressure is greater than the spring pressure retaining these elements in the holder 104.

Figure 8:
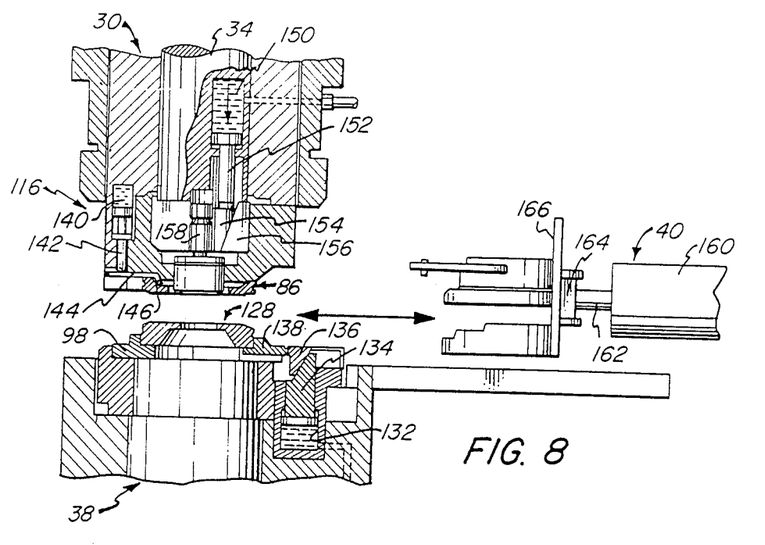
FIG. 8 is a fragmentary and partially diagrammatic side elevational view of the automatic tool changer punch press of FIG. 1 with portions in section to reveal internal construction and illustrating the motion of the tool changer mechanism and hydraulic clamping mechanisms for the punch, stripper and die.

In FIGS. 8 (and in FIG. 9), there are diagrammatically illustrated the several hydraulic clamping mechanisms and a portion of the automatic tool changer mechanism 40 of the embodiment of FIG. 1. Turning first to the die holder assembly 38, hydraulic fluid under pressure is supplied to the chamber 132 and pushes upwardly an actuator member 134 which has a cam surface that pushes against the member 136 and thereby causes the lock member 138 to firmly grip the die 128 in the die holder block 98.

The stripper holder assembly 116 similarly has a chamber 140 to which hydraulic fluid is supplied to move the actuator 142 downwardly against a lever 144 which is pivoted adjacent its radially outer end. As it does so, it presses the tongue 146 on the inner end of the lever 144 firmly against an inner chamfered surface on the stripper 118.

The lower portion 34 of ram assembly 30 similarly has a chamber 150 to which hydraulic fluid is supplied to drive the piston 152 downwardly, and it has a wedge-shaped portion 154. The wedge member 156 is coupled thereto and moves downwardly with it until it bottoms in its track (not shown) after which the piston 152 with its wedge portion 154 continues to move downwardly. Since the wedge portion 154 has an arcuate surface cooperating with that of the stem 158 of the die 128. This produces a very high frictional pressure on the stem 158 of the punch 116 to firmly clamp it on the lower portion 34 of the ram assembly 30.

The operating mechanism for removing and transporting the tooling between mounted positions and storage positions on the carriers is also shown. The cylinder 160 drives a piston 162 inwardly and outwardly, and it has a key 164 at its outer end which engages in a cooperating recess or keyway on the cartridge 164 to move it from the carriers (not shown) against the stripper holder assembly 86, ram 34, and die holder block 98. At this point, a switch (not shown) is triggered and the hydraulic clamping mechanisms are actuated to release the tooling or clamp the tooling as the case might be. The piston 162 in turn supports the tooling carrier arms 164 picked up the tooling for movement back and forth.

Figure 9A:
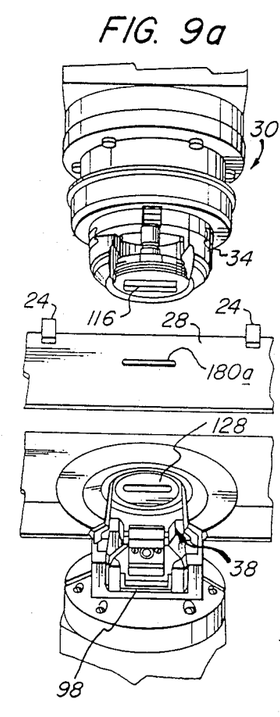
FIGS. 9a–9c are fragmentary, partially diagrammatic views of the ram and die holder assemblies with a workpiece therebetween, with the ram and die rotated and the workpiece indexed in the successive views to produce a three stroke cutout.
Figure 9B:
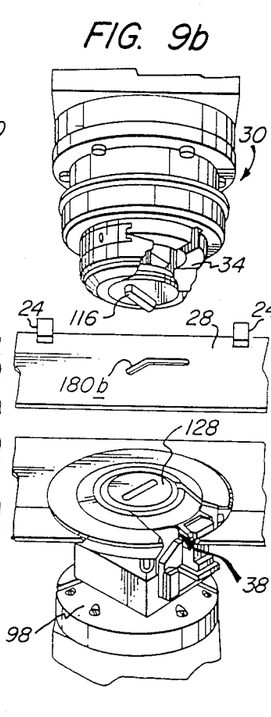
Figure 9C:
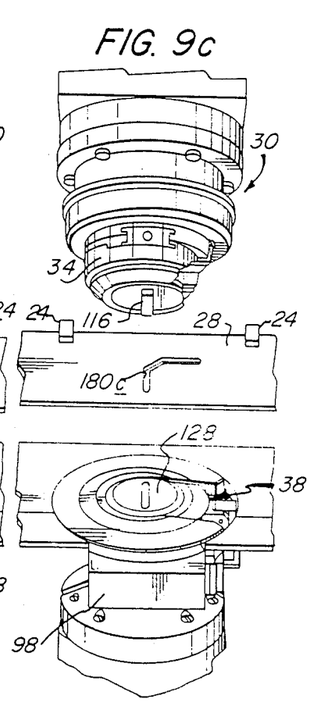

Turning now to FIGS. 9a through 9c, the operation of the press of the present invention is diagrammatically illustrated by three successive punching strokes effected upon the workpiece 28 by the same set of tooling. As seen, the punch 116 of an elongated configuration with rectilinear sides and arcuate ends. The die 128 is of cooperating configuration.

In FIG. 9a the punch 116 is oriented with its longitudinal axis oriented in the Y axis of movement of the workpiece 28 with respect to the worktable 20. As a result, it produces the cutout 180a shown in FIG. 9a.

In FIG. 9b, both the lower portion 34 of the ram assembly 30 and the die holder assembly 38 have been rotated approximately 45 degrees, and the workpiece 28 has been indexed to the right along the Y axis and rearwardly along the X axis. As a result, when the lower portion 34 of the ram assembly 30 is reciprocated downwardly, it produces the cutout portion 180b which extends at an angle of 45 degrees to the first portion 180a. Moreover, as can be seen, the indexing along the X and Y axes is such that the arcuate end of the punch 116 falls within the terminal portion of the original cutout 180a so that there is an angular intersection between the portions 180a and 180b.

In FIG. 9c, the punch 116 and die 128 have been rotated still further to orient them at 90 degrees from the original position in FIG. 9a. The workpiece 28 has been indexed still further in the Y direction and still further in the X direction. As a result, when the lower portion 34 of the ram assembly 30 is reciprocated, it produces a cutout portion 180c which has its axis perpendicular to the axis of the portion 180a and which intersects the outer portion of the cutout 180b. Thus, the punch 116 of relatively small cross-section has produced a composite cutout of relatively large and multiangular configuration.

As seen in FIG. 6, this operation can be repeated any number of times at spaced points about the workpiece 28 by appropriate indexing of the workpiece 28 through the workpiece clamping mechanism 24 and the control means 200.

As will be readily appreciated, the rotational movement of the ram assembly 30 and die holder assembly 38, and the indexing of the workpiece may be controlled so as to produce a relatively large cutout by rapid reciprocating steps of the type known as nibbling. It will also be appreciated that, after some finite number of strokes of the press using a particular punch and die combination, a punch and die of different configuration may be substituted on the ram and in the die holder to produce cutouts of a different configuration. These may be spaced from those of the first punch and die combination or contiguous thereto depending upon the nature of the cutouts desired. Moreover, more such substitutions may be made if so desired although proper selection of tooling configuration and rotation will afford the opportunity for minimization of the number of different sets required for various configurations of cutouts.

Reference may be made to Herb et al, U.S. Pat. No. 4,274,801 granted on June 23, 1981 for further description of X-Y guidance systems for the workpiece.

For detail descriptions on suitable tool changer mechanisms, reference may be made to Herb, U.S. Pat. No. 3,816,904 granted June 18, 1974; and Herb et al, U.S. Pat. No. 4,103,414 granted Aug. 1, 1978.

It will be appreciated that the punch press of the present invention affords excellent control of the punching operation and the opportunity to minimize tool wear due to the fact that the punch and die are rigidly supported on the ram assembly and in the die holder assembly. The gear drive mechanism provides a relatively rugged assembly with precise control over the amount of rotation, and the rotation is simultaneously effected by the common drive mechanism. In the automatic tool changer embodiment, all tooling is readily available for use on the relatively rotatable ram and die holder members so as to afford a high degree of versatility and rapid tool change.

Although the punch press mechanisms illustrated herein is of the mechanical drive type using a crank shaft, it should be readily appreciated that the present invention is also readily employable in connection with punch presses using hydraulic actuation or drive of the lower portion of the ram assembly. In such presses, the upper portion of the ram assembly generally comprises a cylinder into which highly pressured hydraulic fluid is introduced to reciprocate the lower portion of the ram assembly which clears the punch. In such presses, a pinion gear ring is simply provided about the lower portion of the ram assembly and the housing thereabout provides clearance for the pinion ring to move axially therewithin.

Thus, it can be seen from the foregoing detailed specification and attached drawings that the punch press of the present invention is one which is rugged and which provides secure engagement of the punch and die and precisely controlled simultaneous rotation thereof to permit precision punching of the workpiece. The programmed indexing of the workpiece coupled with programmed rotation of the ram assembly and die holder permits highly effective and rapid punching and contouring of cutouts of relatively complex configuration using the same set of tooling and, by substitution of one or more sets of tooling, even more complex operations and configurations. The method of the present invention is simple, reliable and economical to permit facile generation of complex cutouts and contouring.

Having thus described the invention, what is claimed is:

1. In a method for producing cutouts from a sheet-like workpiece, the steps comprising:
   (a) providing a punch press having a frame with a base and a head spaced thereabove, a ram assembly in the head including an upper portion and a lower portion reciprocatable along a vertical axis relative to the base of said punch press frame and rotatable relative to the upper portion about said axis, a die holder mounted in said base of said frame for rotation about an axis coaxial with the axis of rotation of said ram lower portion;
   (b) mounting a punch on the lower end of said ram lower portion;
   (c) mounting in said die holder a die cooperating with said punch, said punch and die being aligned and defining a workstation therebetween;
   (d) supporting a sheet-like workpiece between said die and punch;
   (e) reciprocating said ram lower portion to drive said punch through said workpiece at said work station to produce a cutout;
   (f) indexing said workpiece in a horizontal plane a predetermined distance relative to the vertical axis of rotation of said die and ram lower portion, said distance being less than the cross section of said punch;
   (g) simultaneously rotating said ram lower portion and die holder at said workstation;
   (h) reciprocating said ram lower portion to drive said punch through said workpiece to produce a cutout contiguous to that formed in the prior step of reciprocation; and
   (i) repeating steps (f)–(h);
   (j) substituting a second punch and second die of a configuration distinct from that of said first mentioned punch and die; and
   (k) repeating steps (f)–(h) to provide a cutout of a configuration different from that produced by said first mentioned punch and die, said repetition of steps (f)–(h) with said second punch and die producing a series of contiguous cutouts which cooperate with those of said first mentioned punch and die to provide an enlarged contoured cutout having a configuration distinct from those of said first-mentioned and second punches.

* * * * *